United States Patent [19]

Rosenstock et al.

[11] 4,277,791

[45] Jul. 7, 1981

[54] INK CONTROLLING DEVICE FOR INK PRINTING EQUIPMENT IN OFFICE MACHINES AND THE LIKE

[75] Inventors: Guenter Rosenstock; Wilfried Kindler, both of Munich, Fed. Rep. of Germany

[73] Assignee: Siemens Aktiengesellschaft, Berlin & Munich, Fed. Rep. of Germany

[21] Appl. No.: 22,379

[22] Filed: Mar. 20, 1979

[30] Foreign Application Priority Data

Mar. 22, 1978 [DE] Fed. Rep. of Germany ....... 2812562

[51] Int. Cl.[3] ........................ G01D 15/16; B41F 31/02

[52] U.S. Cl. ................................ 346/140 R; 101/364; 101/366

[58] Field of Search .................... 101/366, 1, 364, 363; 346/140 R, 75, 140 PD, 140 A; 222/83, 83.5, 80, 81, 82, 549, 576, 589

[56] References Cited

U.S. PATENT DOCUMENTS

| | | | |
|---|---|---|---|
| 2,098,524 | 11/1937 | Smith | 222/83 X |
| 3,200,813 | 8/1965 | Christakis | 128/764 X |
| 3,469,572 | 9/1969 | Nehring | 128/764 |
| 3,708,798 | 1/1973 | Hildenprand et al. | 346/75 X |
| 4,074,284 | 2/1978 | Dexter et al. | 346/140 PD |
| 4,126,868 | 11/1978 | Kirner | 346/140 R |
| 4,161,670 | 7/1979 | Kern | 346/140 R |
| 4,162,501 | 7/1979 | Mitchell et al. | 101/366 X |

FOREIGN PATENT DOCUMENTS

| | | | |
|---|---|---|---|
| 1266520 | 4/1968 | Fed. Rep. of Germany | 101/366 |
| 2262327 | 12/1973 | Fed. Rep. of Germany | 101/366 |
| 2321273 | 8/1974 | Fed. Rep. of Germany | 101/366 |
| 2362576 | 2/1975 | Fed. Rep. of Germany | 101/366 |
| 2457643 | 6/1976 | Fed. Rep. of Germany | 101/366 |
| 1492298 | 11/1977 | United Kingdom | 101/366 |

*Primary Examiner*—J. Reed Fisher

*Attorney, Agent, or Firm*—Hill, Van Santen, Steadman, Chiara & Simpson

[57] ABSTRACT

A device for ink printing equipment in office, data or telex machines and the like, for controlling the supply from ink reservoir to the printing head of the machine in which the ink reservoir is movable from a normal position in which ink may be supplied to the machine, to an inoperative position in which supply of ink to the machine is cut off.

3 Claims, 4 Drawing Figures

INK CONTROLLING DEVICE FOR INK PRINTING EQUIPMENT IN OFFICE MACHINES AND THE LIKE

BACKGROUND OF THE INVENTION

The invention relates to a device for selectively preventing the flow of ink in ink printing equipment such as office, data or telex machines and the like, in which ink is supplied to the printing head from a replaceable ink reservoir, and in which a hollow needle in the ink supply line to the printing head extends into the ink reservoir and is provided with an aperture adapted to be in communication wich such ink.

For creating curved shapes or alphanumerical symbols on carrier materials, the use of printing arrangements in which ink is applied directly to the carrier material is well known. Inked mosaic printers and the like are typical examples for this purpose. Arrangements have become known (German DE-OS 24 60 573, DE-OS 25 43 452, DE-OS 26 10 518) in which the ink is supplied to the printing head involved from a replaceable ink reservoir. In this case a hollow needle which forms the inlet end of the ink supply line to the printing head, extends through the wall of the ink reservoir or through a sealing plug in the wall of the reservoir, whereby the ink fluid has access to the inlet aperture in the hollow needle. The wall of the ink reservoir or the sealing plug therein is formed of a resilient material such that the opening through which the hollow needle passes will close up and seal itself upon removal of the hollow needle. This enables, for example, the replacement and storage of ink reservoirs, even when only partially empty.

One desirable objective in a structure such as that described, is to insure that the flow of ink from the reservoir to the printing head can be prevented when the machine is not operating, and in particular during servicing or transportation of the machine. This objective should be so achieved that when the position of the machine is to be altered or when it is jolted in transit no ink can escape from the nozzles in the printing head and produce a messy condition. Arrangements have become known (German DE-OS 23 21 273, DE-OS 23 62 576), in which the ink nozzles are directly covered when the printing head is in a particular position so that no ink can escape therefrom. Arrangements are also known (German DE-OS 24 57 643, DE-AS 22 62 327) in which stop or shut off valves are disposed in the ink supply line between the ink reservoir and printing head.

BRIEF SUMMARY OF THE INVENTION

The invention has the particular objective to provide a simple and efficient arrangement for selectively shutting off the flow of ink between the ink reservoir and printing head of an inked printer. In accordance therewith, the invention proceeds from ink reservoirs into which hollow needles, having inlet apertures for the discharge of ink, may be pushed through the reservoir side wall or through a sealing plug disposed in and carried by a side wall thereof. In a preferred embodiment of the invention, such as illustrated in the application, this objective is realized by the provision in the hollow needle of an inlet aperture which extends at right angles to the axis of the needle and thus to the direction of passage of the needle through the wall in the ink reservoir, which aperture is smaller in diameter than the thickness of the wall at the location of penetration. An adjusting mechanism is provided for selectively moving the ink reservoir in the direction of penetration of the needle therein, from a working position in which the inlet opening of the needle communicates with the interior of the ink reservoir, to another, inoperative position, in which the inlet aperture of the needle is disposed between the wall surfaces of the ink reservoir and is sealed by the portions of the wall in sealing engagement with the needle.

By means of a device having such features, in accordance with the invention, the ink inlet apertures in the needle can be disposed from the working position, in which such inlet openings are in communication with the ink supply in the reservoir, to a position in which they are closed or sealed by the wall of the ink reservoir, involving simple relative movement between the hollow needle and the ink reservoir in the direction of penetration thereof, so that the flow path between the ink reservoir and printing head is cut off. The adjusting mechanism readily can be so constructed that the working and inoperative positions can be accurately determined and fixed.

In accordance with a preferred embodiment of the invention the ink reservoir is suitably mounted for partial rotation about the hollow needle. A slotted guiding arrangement disposed adjacent the periphery of the reservoir and having two guide portions extending at right angles to the direction of the reservoir displacement, determines the working or inoperative end positions of the reservoir, with an intermediate guide portion connecting the two guide portions to enable movement of the ink reservoir to either end position.

With an arrangement such as above described, the ink reservoir can be readily moved, merely by a partial rotation thereof, out of the working position in which the printing head is supplied with ink, into the inoperative position in which the supply of ink to the printing head is cut off. Only negligible minor constructional features are required to provide such an ink supply cut off. If plastic parts are employed, as is common, the supporting structure or casing for the ink reservoir may be suitably formed to provide the slotted guiding arrangement, such as illustrated in the exemplary arrangement illustrated in the drawings, and the ink reservoir is provided with a suitable cooperable guide pin which is movable in the slotted arrangement. Preferably, to counteract any tendency for the ink reservoir to tilt in the casing, two or more slotted guide arrangements can be suitably disposed around the periphery of the reservoir.

Preferably, the wall of the ink reservoir in the area thereof through which the hollow needle is to pass, incorporates a plug of resilient sealing material, through which the hollow needle extends. Such plug is so constructed that the hollow needle can readily penetrate it, but at the same time, upon removal of the needle, the opening formed thereby will readily seal itself. In addition, such plug may form the closure for the ink reservoir, usually the sole enclosure, whereby it can easily be changed and replaced by a new plug. Neither the material nor the wall thickness of the ink reservoir involves any special requirements with regard to a possible leakage flow of ink out of the ink reservoir.

It is also possible, in accordance with the invention, to provide suitable switch means adapted to be disposed near the ink reservoir for actuation by predetermined position of the reservoir. Thus such switch may be so actuated that when the supply of ink to the printing head is cut off, the switch is in suitable operative position to suitably prevent operation of the machine involved.

BRIEF DESCRIPTION OF THE DRAWING

In the drawing which illustrates one exemplary embodiment of the invention.

DETAILS OF THE INVENTION

Figure 1:
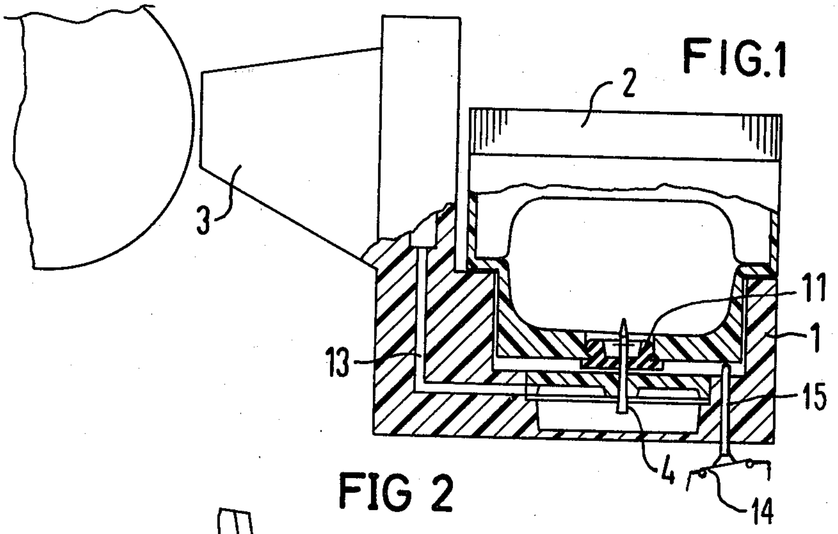
FIG. 1 is a side elevational view of an ink mosaic printer, with portions thereof in section, disposed in front of a cooperable platen.

FIG. 1 illustrates an ink mosaic printing arrangement disposed in cooperable position with respect to a platen adapted to carry the carrier material which is to receive the printing, and in which relative movement between the platen and head is to be effected in suitable manner, known per se. The ink mosaic printing arrangement includes a printing head 3 to which ink is supplied along a suitable duct system 13, with the ink being supplied from an ink reservoir 2 which is adapted to be replaceably inserted in the ink mosaic printer.

Figure 2:
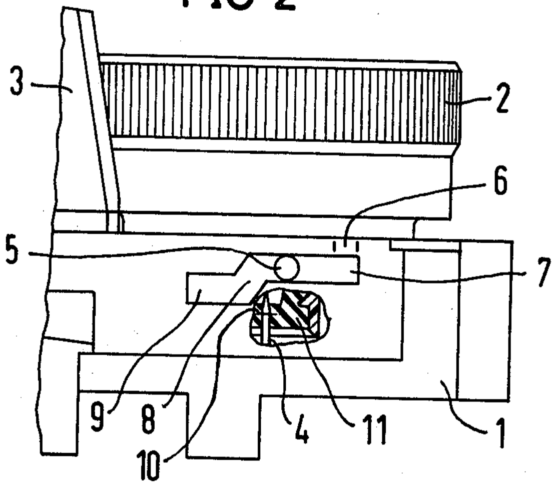
FIG. 2 is a side elevational view similar to FIG. 1, with a portion broken away, illustrating the ink reservoir in an inoperative position.
Figure 3:
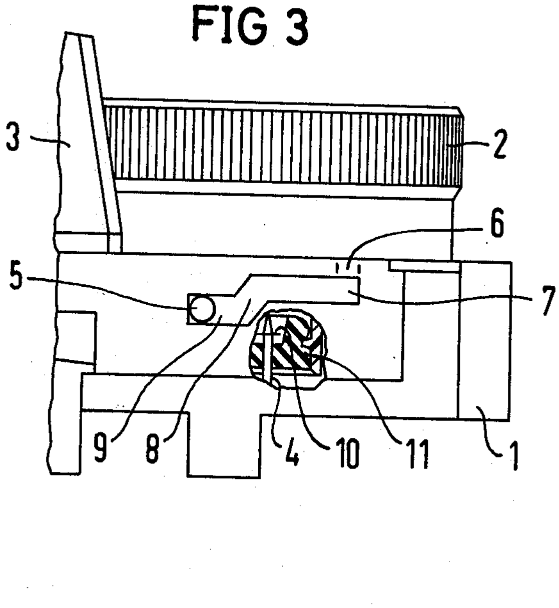
FIG. 3 is a view similar to FIG. 2 illustrating the ink reservoir in working position.

The holder 1 for the ink reservoir 2 is a part of the printing head 3, partially illustrated in FIGS. 2 and 3. When the machine is operating, ink is supplied to the printing head 3 through a hollow needle 4, which forms an integral part of the holder 1. The ink reservoir 2 is guided in the holder 1 by means of a pin 5 carried by the ink reservoir and extending into a guide slot comprising four portions or sections 6, 7, 8 and 9. The section 6 permits the ink reservoir to be inserted in or removed from the holder. When the pin 5, carried by the ink reservoir 2, is in the guide portion 7, the ink reservoir is in an inoperative position, which may be selected, for example, when it is desired to move the machine. When the pin 5 is disposed in the guide portion 9, the ink reservoir is in its working position, with the intermediate guide portion 8 extending at an angle and connecting the portions 7 and 9 to enable the pin 5 of the reservoir 2 to be moved from the portion 7 to the portion 9.

Figure 4:
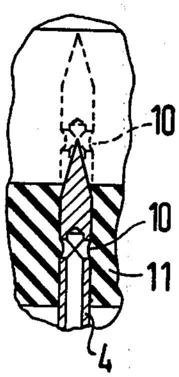
FIG. 4 is a fragmentary view of a portion of the hollow needle and adjacent wall of the plug penetrated thereby.

Functionally, the movement of the ink reservoir between inoperative and working positions determines the relative position of the needle 4 with respect to the adjacent wall of a sealing plug 11 which is incorporated in the wall of the ink reservoir 2. As will be apparent from FIG. 4, which is an enlarged sectional view of the upper pointed end of the needle 4 and the adjacent portion of the sealing plug 11, when in the inoperative position, as illustrated in broken lines in FIG. 4, the transversely extending apertures 10 of the hollow needle are disposed above the plug 11 and thus in communication with the ink supply within the reservoir. When the reservoir is in its inoperative position, as illustrated in FIG. 4, the inlet apertures in the hollow needle, extending at right angles to the direction of penetration, are closed by the adjacent material of the sealing plug, whereby ink flow from the reservoir interior through the hollow needle 4 is cut off. However, by means of the simple rotary movement of the ink reservoir resulting in greater penetration of the needle relative to the plug 11, operative position of the needle may be readily effected.

The invention has the very important feature that as a result of the closure of the needle being effected by relative movement between it and the sealing plug 11, such sealing movement between the parts has no effect whatsoever on the ink within the needle and duct system therefor to the printing head. In other words, the inlet apertures of the needle are effectively sealed without effecting any change in volume within the system, either when opening or when closing such apertures. Consequently, there is no danger of ink escaping from or being sucked back into the chambers of the printing head when making such selection.

In accordance with a further feature of the invention, the arrangement described may be readily utilized to provide a control of the machine involved, responsive to the relative position of the reservoir with respect to the printing head and associated supporting structure. As illustrated in FIG. 1, a switch 14, may for example, be suitably carried by the holder 1, which switch is controllable by a suitable actuating element, such as an actuating pin 15, illustrated as extending through the adjacent portion of the holder 1 with its upper end in the path of the bottom wall of the ink reservoir 2. Thus, when the ink reservoir is in its inoperative position, as illustrated in FIG. 2, the bottom of the reservoir would be so positioned that the pin 15 is in an elevated position and the switch 14 in a rest position, and when the reservoir 2 is in its operative position, as illustrated in FIG. 1, the pin 15 will be moved downwardly to correspondingly operate the switch to an actuated position, the particular arrangement of the contacts thereof depending upon the circuitry involved. The switch here shown in FIG. 1 is closed when the pin 15 is moved sufficiently downwardly for completing the operating circuit which drives the printing head of the printing machine. A typical operating circuit is shown and described in U.S. Pat. No. 4,161,670. By suitably disposing such switch in the electrical circuit of the machine involved, such machine, for example, may be rendered inoperative when the reservoir 2 is in its inoperative position.

Although we have described our invention by reference to particular illustrative embodiments, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim as our invention:

1. In a device for optionally shutting off the supply in an ink printing machine, with the ink being supplied to a printing head of the machine from a replaceable ink reservoir, in which device a hollow needle in the ink feed line to the printing head extends into the ink reservoir and is provided with an inlet aperture, the combination of the inlet aperture of the hollow needle extending at right angles to the direction of penetration of the hollow needle through the adjacent wall of the ink reservoir, which inlet aperture is smaller in diameter than the wall thickness at the point of penetration, an adjusting mechanism for permitting movement of the ink reservoir in the direction of penetration of the hollow needle through the reservoir wall between working and inoperative positions, said working position being where said inlet aperture is disposed within said ink reservoir above said adjacent ink reservoir wall and said inoperative position being where said inlet aperture is disposed in engagement with and sealed by the wall of the ink reservoir, wherein the ink reservoir is so disposed that it can rotate and pivot about the hollow needle, and said adjusting mechanism including a pin means fixably connected with the exterior surface of said ink reservoir and a slotted guide arrangement located in a wall member adjacent said ink reservoir exterior surface for cooperably receiving said pin, said slot arrangement provided with two end portions extending at right angles to the direction of movement of the reservoir, for respectively disposing the ink reservoir in said working and said inoperative positions and an intermediate guide portion connecting said two end portions for enabling adjustment of the ink reservoir to either of said two positions.

2. A device according to claim 1, wherein the wall of the ink reservoir is provided with a plug of resilient sealing material through which the hollow needle extends.

3. A device according to claim 1, comprising in further combination, actuation means cooperably arranged relative to said ink reservoir, said actuation means being triggered when said reservoir is in, its working position, and switch means for controlling the operation of the printing machine, said switch means being cooperably arranged relative to said actuation means such that said actuation means operates said switch when triggered.

* * * * *